W. C. Marshall,
Meat Press.

N°. 43,516.          Patented July 12, 1864.

Witnesses:
J. P. Hall,
F. McNamara

Inventor:
W. C. Marshall

UNITED STATES PATENT OFFICE.

W. C. MARSHALL, OF NEW YORK, N. Y.

IMPROVED PROCESS FOR PRESERVING MEATS.

Specification forming part of Letters Patent No. 43,516, dated July 12, 1864.

*To all whom it may concern:*

Be it known that I, W. C. MARSHALL, of the city, county, and State of New York, have invented a new and Improved Process of Preserving Meats; and I do hereby declare that the following is a full, clear, and exact description thereof, which will enable others skilled in the art to make and use the same, reference being had to the accompanying drawings, forming part of this specification, in which—

Figure 1:
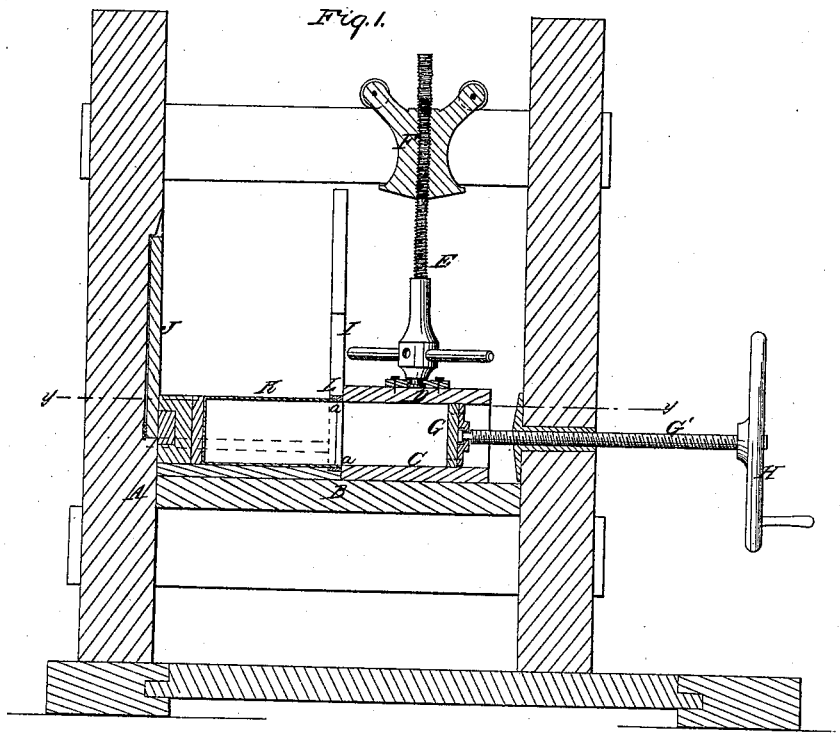
Figure 2:
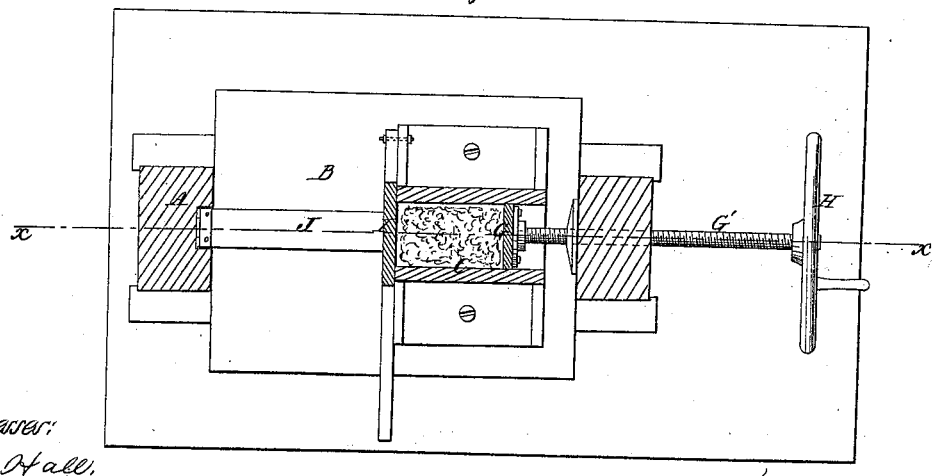

Figure 1 represents a longitudinal vertical section of the apparatus which I use in carrying out my invention, the plane of section being indicated by the line $x\,x$, Fig. 2. Fig. 2 is a horizontal section of the same, taken in the plane indicated by the line $y\,y$, Fig. 1.

Similar letters of reference indicate like parts.

This invention consists in exposing the meat to be preserved, before it is put up in packages, to a heavy pressure, in such a manner that nearly all the water not chemically combined with the meat and a large quantity of air contained between the various pieces and in the pores of the same are expelled before the meat is put up in packages, and by these means the principal agents of putrefaction are removed and its bulk is considerably reduced.

It consists, further, in a press box provided with a hinged end and movable screw-top, in combination with a follower, and also with a frame fitting to the end of said press-box, and capable of receiving and holding the mouth of the package to be filled with meat in such a manner that by removing the top of the press-box the meat can be easily introduced, and by closing down said top it (the meat) can be readily compressed to agree with the size of the package, and, after it has been compressed, by opening the movable end of the press-box and putting the package in its place the compressed meat can be easily forced into the package without exposing the package to any undue strain or pressure.

The ordinary method of preserving meats for commercial purposes is substantially as follows: The meat, being first subjected to the action of salt and saltpeter in the form of brine until the water of the meat is saturated, is then removed from the brine and placed in packages of wood with an entirely new solution of salt and saltpeter. This process is known to be destructive of all, or nearly all, the nutritious values of the meat in a very short space of time.

My process is executed as follows: After rendering the water of the meat temporarily proof against putrefaction by any of the ordinary processes, said water being the only destroying agent, I remove a large percentage of it, the remainder being fixed by the concentrated antiseptics. I then subject a given quantity of the meat to pressure in a box or cylinder until all air is driven out and the space occupied by the meat agrees with the size of the package it is intended to fill. When the meat is in its place, the box is hermetically sealed, and in this state, retaining all its nutritive qualities, the meat will remain perfect as long as the package remains intact. The advantages of this process are, first, that the natural values of the meat are not destroyed by the means of protecting it from putrefaction, as is unavoidable in the ordinary processes; second, that only about one-half the space and weight ordinarily required is necessary by this mode for the same quantity of meat.

The apparatus which I use to carry out my process consists of a strong frame, A, made of wood or any other suitable material, and provided with a table, B, which supports the press box C. The top D of this box is suspended from a screw, E, which is tapped into a nut, F, resting on wheels or otherwise arranged in such a manner that the top can be easily removed from over the box, and, after the meat has been introduced, readily replaced and brought down firmly by means of the screw.

G is the follower, which is attached to the screw G', provided with a hand-wheel, H, or otherwise arranged so that said follower can be readily moved in and out and a powerful pressure can be exerted by the same. The end I of the press-box, which is opposite the follower, is hinged, so that it can be easily opened, and when it is closed down and the box rigged up for compressing a quantity of meat said hinged end is held in position by a brace, J, which is hinged to one of the uprights of the frame A. After the meat has been compressed to the desired degree the hinged end I is thrown open, and the package K, intended to receive the meat, is put in position. The mouth of this package is held in a metallic frame, L, the interior of which corresponds in size and shape exactly with the press-box, and which is provided with a shoulder, *a*, to the thickness of the sides of the package. A suitable wedge, M, or other device retains the package and frame in position, and by moving the follower in the proper direction the compressed meat is pushed into the package. The meat, being non-elastic, readily retains its bulk, and the sides of the package are not exposed to any undue strain. After the package has been filled it is removed from the press and immediately sealed up hermetically, and the meat thus prepared can be preserved for a long time, provided the package remains closed.

Having thus described my invention, I claim as new and desire to secure by Letters Patent—

1. Exposing the meat to be preserved, previous to putting it up in packages, to a heavy pressure, substantially as and for the purpose herein specified.

2. The press-box C, with its movable screw-top D, follower G, and hinged end I, constructed and operating substantially as and for the purpose herein shown and described.

3. The frame L, applied, in combination with the package K and press-box C, in the manner and for the purpose substantially as herein set forth.

W. C. MARSHALL.

Witnesses:
J. P. HALL,
M. M. LIVINGSTON.